United States Patent
Goodburn et al.

(10) Patent No.: US 9,266,606 B2
(45) Date of Patent: Feb. 23, 2016

(54) AIRCRAFT LANDING GEAR

(75) Inventors: Simon Goodburn, Gloucester (GB); Glen Chisholm, Gloucester (GB); Sam Nell, Cheltenham (GB)

(73) Assignee: Messier-Dowty Limited (GB)

( * ) Notice: Subject to any disclaimer, the term of this patent is extended or adjusted under 35 U.S.C. 154(b) by 251 days.

(21) Appl. No.: 13/821,752

(22) PCT Filed: Sep. 8, 2011

(86) PCT No.: PCT/GB2011/051677
§ 371 (c)(1),
(2), (4) Date: May 21, 2013

(87) PCT Pub. No.: WO2012/032347
PCT Pub. Date: Mar. 15, 2012

(65) Prior Publication Data
US 2013/0233968 A1    Sep. 12, 2013

(30) Foreign Application Priority Data

Sep. 8, 2010    (GB) .................................. 1014948.2

(51) Int. Cl.
*B64C 25/20*    (2006.01)
*B64C 25/34*    (2006.01)
(Continued)

(52) U.S. Cl.
CPC ................. *B64C 25/20* (2013.01); *B64C 25/22* (2013.01); *B64C 25/34* (2013.01); *B64C 2025/008* (2013.01); *B64C 2025/345* (2013.01)

(58) Field of Classification Search
CPC ........ B64C 25/20; B64C 25/22; B64C 25/34; B64C 2025/345; B64C 2025/008; B64C 25/60; B64C 25/58; B64C 25/001
USPC ....... 244/102, 102 A, 102 SS, 102 R, 104 FP, 244/102 SL, 100 R
See application file for complete search history.

(56) References Cited

U.S. PATENT DOCUMENTS 3,054,582 A    9/1962    Lucien
4,552,324 A    11/1985    Hrusch
(Continued)

FOREIGN PATENT DOCUMENTS

FR    2 800 704        5/2001
GB      643636 A       9/1950
(Continued)

OTHER PUBLICATIONS

Young, Hal; GB Intellectual Property Office Examiner, Combined Search and Examination Report Under Sections 17 and 18(3) for GB1014948.2, Dec. 20, 2010.
(Continued)

*Primary Examiner* — Valentina Xavier
(74) *Attorney, Agent, or Firm* — RatnerPrestia (57) ABSTRACT

An aircraft landing gear including: a main strut having an upper portion arranged to be coupled to the underside of an aircraft and a lower portion telescopically mounted with respect to the upper portion; a bogie including a bogie beam pivotally coupled to the lower portion of the main strut, the bogie beam having a plurality of axles mounted on it, each axle carrying one or more wheel assemblies; an actuator arranged such that a change in its effective length causes a change in the angular position of the bogie relative to the main strut, and a control port arranged to be coupled to a control fluid supply system, wherein the aircraft landing gear includes or is in combination with a control valve having a first configuration in which it permits control fluid to be supplied to the control port of the actuator at a first pressure and a second configuration in which the control valve permits the supply of control fluid to the control port at a second pressure less than the first pressure so as to reduce loads experienced by components of the actuator during taxiing.

18 Claims, 5 Drawing Sheets

(51) Int. Cl.
*B64C 25/22* (2006.01)
*B64C 25/00* (2006.01)

(56) References Cited

U.S. PATENT DOCUMENTS

| | | |
|---|---|---|
| 4,729,529 A | 3/1988 | Hrusch |
| 5,110,068 A | 5/1992 | Grande et al. |
| 6,182,925 B1 * | 2/2001 | Kilner et al. ............ 244/102 SL |
| 6,308,916 B1 * | 10/2001 | Hrusch ................... 244/102 R |
| 7,416,156 B2 | 8/2008 | Hinton |
| 8,136,759 B2 | 3/2012 | Lavigne et al. |
| 2003/0033927 A1 | 2/2003 | Bryant et al. |
| 2008/0033607 A1 * | 2/2008 | Zeliff et al. ...................... 701/29 |
| 2009/0050736 A1 * | 2/2009 | Bennett et al. ........... 244/102 R |
| 2010/0116930 A1 | 5/2010 | Griffin |
| 2010/0133379 A1 | 6/2010 | Devlieg |
| 2010/0288878 A1 * | 11/2010 | Bennett .................. 244/104 FP |

FOREIGN PATENT DOCUMENTS

| | | |
|---|---|---|
| GB | 1 510 554 | 5/1978 |
| GB | 2470500 | 11/2010 |
| RU | 237 0413 | 10/2009 |
| WO | WO 99/47416 | 9/1999 |
| WO | WO 00/66430 | 11/2000 |
| WO | WO 2006/094145 A1 | 9/2006 |

OTHER PUBLICATIONS

Fernandez Plaza, P., Authorized Officer of the EPO, International Search Report for PCT/GB2011/051677, Dec. 13, 2011.

Fernandez Plaza, P., Authorized Officer of the EPO, International Preliminary Report on Patentability for PCT/GB2011/051677, Jun. 29, 2012.

Office Action, with English translation, for CN 201180053179.1 dated Nov. 18, 2014.

Chinese Office Action mailed Jul. 9, 2015 for Chinese Application No. 201180053179.1, with English translation.

* cited by examiner

PRIOR ART

AIRCRAFT LANDING GEAR

This application is a U.S. National Phase application of PCT International Application No. PCT/GB2011/051677, filed Sep. 8, 2011, which claims the benefit of GB1014948.2, filed Sep. 8, 2010.

BACKGROUND OF THE INVENTION

A typical landing gear comprises a main strut having an upper portion adapted to be connected to the underside of the aircraft and a lower portion telescoping within the upper portion and pivotally connected to a bogie. The bogie comprises a bogie beam with axles and wheels mounted on the bogie beam fore and aft of a main pivot by which the bogie beam is connected to the lower portion of the main strut.

The main strut can be moved between a deployed position, for ground manoeuvring take off and landing, and a stowed position, for flight. When in the stowed position both the strut and bogie are contained within a landing gear cavity in the aircraft. The bogie beam must be within a range of angular positions with respect to the strut to enable the landing gear to be stowed in the cavity without striking the aircraft fuselage. The angular position or "pitch" of the bogie beam relative to the strut required for stowing is known in the art as its "trimmed" position.

A "pitch trimming" actuator is provided to control the pitch of the bogie beam. A pitch trimming actuator is generally controlled by hydraulic fluid supplied at positive pressure so as to cause the pitch trimming actuator to adopt a predetermined length corresponding to the trimmed position of the bogie beam.

The pitch of the bogie beam can be changed by external forces applied to it, such as when the aircraft lands and during taxiing of the aircraft. The hydraulic fluid supply constantly works against such forces, such that in the absence of any applied forces that exceed the positioning force due to the hydraulic fluid supply, the bogie beam adopts its trimmed position. An example of this is when the aircraft takes off. When taxiing, the pitch trimmer provides a hydraulic damping function that damps pivoting movements of the bogie as it engages bumps or dips in the runway. The applicant has identified that this can lead to deterioration of components of the pitch trimmer and other parts of the landing gear, such as the linkage bearings.

SUMMARY OF THE INVENTION

According to a first aspect of the present invention, there is provided an aircraft landing gear including: a main strut having an upper portion arranged to be coupled to the underside of an aircraft and a lower portion telescopically mounted with respect to the upper portion; a bogie including a bogie beam pivotally coupled to the lower portion of the main strut, the bogie beam having a plurality of axles mounted on it, each axle carrying one or more wheel assemblies; an actuator arranged such that a change in the effective length of the actuator causes a change in the angular position of the bogie relative to the main strut, and a control port arranged to be coupled to a control fluid supply system, wherein the aircraft landing gear includes or is in combination with a control valve having a first configuration in which it permits control fluid to be supplied to the control port of the actuator at a first pressure and a second configuration in which the control valve permits the supply of control fluid to the control port at a second pressure less than the first pressure.

Thus, upon detecting that the aircraft has touched down the control valve reduces the pressure of the control fluid supplied to the port, which reduces the operating pressure and thus the damping ratio for the actuator. This is advantageous because, as noted above, the actuator provides a hydraulic damping function that damps pivoting movements of the bogie as it engages bumps or dips in the runway. For some prior art landing gears, results in the actuator experiencing numerous forces that are short in duration, yet large magnitude. Thus, one of the most onerous operation phases for a conventionally operated pitch trimming actuator is during ground manoeuvring, due to the large number of pressure cycles. During ground manoeuvring, a continuous positioning force is provided to the bogie, which results in the dynamic gland seals within the actuator experiencing high frequency, small displacements under high load, due to the operating pressure of the actuator. Similarly, the pressure relief valve or similar pressure regulating device of the control fluid supply system experiences a corresponding number of operations with the associated wear. This generally results in the dynamic gland seals and/or the pressure relief valve failing earlier than most of the other parts of the landing gear. However, these effects on the dynamic gland seals and pressure relieve valve are lessened in a landing gear according to this aspect of the invention, because of the fact that the operating pressure of the system is reduced upon detection that the aircraft has touched down, thereby reducing the harshness of the operational environment of the actuator during ground manoeuvring. The invention may also reduce fatigue and/or wear of the linkage bearings because the actuator does not force a wheel assembly towards the ground during ground manoeuvres.

In some embodiments the control valve is arranged to change from its first configuration to its second configuration in response to a determination being made that at least one of the wheel assemblies is in contact with the ground.

In some embodiments, the actuator includes a first coupling region via which it is pivotally coupled to the bogie and a second coupling region by which it is pivotally coupled to the main strut. In some embodiments the coupling region regions may be reversed, or one of the region regions may coupled to a multi bar linkage that couples the bogie beam to the main strut.

In some embodiments, the control valve is arranged to change from its second to its first configurations in response to a determination being made that at least one of the wheel assemblies is not in contact with the ground.

In some embodiments, the determination that at least one of the wheel assemblies is in contact with the ground is a first signal provided by an aircraft monitoring system, the control valve being responsive to the signal.

In some embodiments, the determination that at least one of the wheel assemblies is not in contact with the ground is a second signal provided by an aircraft monitoring system, the control valve being responsive to the signal.

In some embodiments, the source of control fluid includes a fluid supply line and a fluid return line, the fluid supply line pressure being greater than the fluid return line pressure, the control valve being arranged in its first configuration to permit the supply line to be in full fluid communication with the control port, and arranged in its second configuration to permit the return line to be in full fluid communication with the control port whist restricting the level of fluid communication between the supply line and the control port. Preferably, in its second configuration the control valve substantially fully restricts fluid communication between the supply line and the control port.

In some embodiments, the landing gear is coupled to the aircraft such that it may be moved from a deployed position to a stowed position and the actuator is arranged such that supply of the control fluid at the first pressure causes the actuator to adopt an effective length corresponding to that required to angularly position the bogie in its correct position for stowage.

In accordance with a second aspect of the present invention, there is provided an aircraft landing gear including: a main strut having an upper portion arranged to be coupled to the underside of an aircraft and a lower portion telescopically mounted with respect to the upper portion; a bogie including a bogie beam pivotally coupled to the lower portion of the main strut, the bogie beam having a plurality of axles mounted on it, each axle carrying one or more wheel assemblies; an actuator including a control port arranged to be coupled to a control fluid supply system, the actuator being arranged such the pressurised control fluid causes it to adopt a default effective length, wherein the landing gear includes a locking device that is pivotally coupled to a first part of the landing gear at a first coupling region and the actuator includes a second coupling region by which it is pivotally coupled to a second part of the landing gear, the actuator being movably coupled to the locking device, the locking device having a first configuration in which it inhibits relative movement between itself and the actuator such that a change in the effective length of the actuator causes a change in the angular position of the bogie relative to the strut and a second configuration in which the locking device permits relative movement between itself and the actuator.

Thus, upon detecting that the aircraft has touched down the locking device releases the actuator so as to permit relative movement between the two. This is advantageous because, as noted above, a pitch trimming actuator provides a hydraulic damping function that damps pivoting movements of the bogie as it engages bumps or dips in the runway. Thus, one of the most onerous operation phases for a conventionally operated pitch trimming actuator is during ground manoeuvring, due to a large number of pressure cycles. During ground manoeuvring, a continuous positioning force is provided to the bogie, which results in the dynamic gland seals within the actuator experiencing a large number of small displacements under high load, due to the operating pressure of the actuator. Similarly, the pressure relief valve or similar pressure regulating device of the control fluid supply system experiences a corresponding number of operations with the associated wear. This generally results in the dynamic gland seals and/or the pressure relief valve failing earlier than most of the other parts of the landing gear. However, these effects on the dynamic gland seals and pressure relieve valve are lessened in a landing gear according to this aspect of the invention, because of the fact that the bogie can move angularly with respect to the strut without substantially loading the actuator. Rather, such angular movement of the bogie results in the second coupling region of the actuator moving relative to the locking device. The invention may also reduce fatigue and/or wear of the linkage bearings because the actuator does not force a wheel assembly towards the ground during ground manoeuvres.

In some embodiments the locking device is arranged to change from its first configuration to its second configuration in response to a determination being made that at least one of the wheel assemblies is in contact with the ground In some embodiments the first part of the landing gear to which the locking device is pivotally coupled is one of the bogie and the main strut and the second part of the landing gear is a different one of the bogie and the main strut than that to which the locking device is coupled. In some embodiments on of the first and second parts of the landing gear may be a multi bar linkage that couples the bogie beam to the main strut.

In some embodiments, the locking device is arranged to change from its second to its first configurations in response to a determination being made that at least one of the wheel assemblies is not in contact with the ground.

In some embodiments, the determination that at least one of the wheel assemblies is in contact with the ground is a first signal provided by an aircraft monitoring system, the locking device being responsive to the signal.

In some embodiments, the determination that at least one of the wheel assemblies is not in contact with the ground is a second signal provided by an aircraft monitoring system, the locking device being responsive to the signal.

In some embodiments, the landing gear is coupled to the aircraft such that it may be moved from a deployed position to a stowed position and the actuator is arranged such that, with the locking device locked to the actuator at a predetermined position, supply of the control fluid at the first pressure causes the actuator to adopt an effective length corresponding to that required to angularly position the bogie in its correct position for stowage.

In some embodiments, the locking device includes a chamber within which a cylinder head of the actuator is slidably constrained, the chamber having a second control port coupled to a second supply of control fluid, the locking device further including a control valve which it permits control fluid to be supplied to the second control port of the locking device at a first pressure when the locking device is in its first configuration and permits the supply of control fluid to the second control port at a second pressure less than the first pressure when the locking device is in its second configuration.

In some embodiments the locking device includes a mechanical clamp arranged to clamp the actuator when the locking device is in its first configuration and release the actuator to an extent permitting relative movement between the actuator and clamp when the locking device is in its second configuration.

According to a third aspect of the present invention, there is provided an aircraft landing gear including a strut having an upper portion arranged to be coupled to the underside of an aircraft and a lower portion telescopically mounted with respect to the upper portion; a bogie including a bogie beam pivotally coupled to the lower portion of the main strut, the bogie beam having a plurality of axles mounted on it, each axle carrying one or more wheel assemblies; a linkage including a first coupling region via which it is pivotally coupled to the bogie and a second coupling region by which it is pivotally coupled to the main strut, the linkage being arranged such that its effective length can be changed so as to cause a change in the angular position of the bogie relative to the strut, the linkage including an actuator; wherein the aircraft landing gear includes or is in combination with a control device operable to a configuration in which the control device is arranged to reduce loads experienced by components of the actuator during taxiing.

Thus, upon detecting that the aircraft has touched down the control device permits the effective length of the linkage to vary. This is advantageous because, as noted above, a known landing gear pitch trimming actuator provides a hydraulic damping function that damps pivoting movements of the bogie as it engages bumps or dips in the runway. Thus, one of the most onerous operation phases for a conventionally operated pitch trimming actuator is during ground manoeuvring, due to a large number of pressure cycles. During ground manoeuvring a continuous positioning force is provided to the bogie which results in the dynamic gland seals within the actuator experiencing a large number of small displacements under high load, due to the operating pressure of the actuator. Similarly, the pressure relief valve or similar pressure regulating device of the control fluid supply system experiences a corresponding number of operations with the associated wear. This generally results in the dynamic gland seals and/or the pressure relief valve failing earlier than most of the other parts of the landing gear. However, these effects on the dynamic gland seals and pressure relieve valve are lessened in a landing gear according to this aspect of the invention because of the fact that the linkage, which includes the actuator and in some embodiments of the invention consists exclusively of the actuator, is permitted to freely change its effective length upon detection that the aircraft has touched down, thereby reducing the harshness of the operational environment of the actuator during ground manoeuvring. The invention may also reduce fatigue and/or wear of the linkage bearings because the actuator does not force one of the wheel assemblies towards the ground during taxiing.

In some embodiments the locking device is arranged to change from its first configuration to its second configuration in response to a determination being made that at least one of the wheel assemblies is in contact with the ground In some embodiments, the control device is arranged to change from its second to its first configurations in response to a determination being made that at least one of the wheel assemblies is not in contact with the ground.

In some embodiments, the determination that at least one of the wheel assemblies is in contact with the ground that is a first signal provided by an aircraft monitoring system, the control device being responsive to the signal.

In some embodiments, the determination that at least one of the wheel assemblies is not in contact with the ground is a second signal provided by an aircraft monitoring system, the control device being responsive to the signal.

In some embodiments, the actuator includes the first coupling region via which it is pivotally coupled to the bogie and the second coupling region by which it is pivotally coupled to the main strut, such that a change in the effective length of the actuator causes the change in the angular position of the bogie relative to the main strut, and a control port arranged to be coupled to a control fluid supply system and wherein the control device is a control valve having a first configuration in which it permits control fluid to be supplied to the control port of the actuator at a first pressure and a second configuration in which the control valve permits the supply of control fluid to the control port at a second pressure less than the first pressure, the control valve being arranged to change from its first configuration to its second configurations in response to the determination being made that at least one of the wheel assemblies is in contact with the ground.

In some embodiments, the source of control fluid includes a fluid supply line and a fluid return line, the fluid supply line pressure being greater than the fluid return line pressure, the control valve being arranged in its first configuration to permit both supply line and return line to be in full fluid communication with the control port and arranged in its second configuration to permit the return line to be in full fluid communication with the control port whist restricting the level of fluid communication between the supply line and the control port. Preferably, in its second configuration the control valve substantially isolates fluid communication between the supply line and the control port.

In some embodiments, the landing gear is coupled to the aircraft such that it may be moved from a deployed position to a stowed position and the actuator is arranged such that supply of the control fluid at the first pressure causes the actuator to adopt an effective length corresponding to that required to angularly position the bogie in its correct position for stowage.

In some embodiments, the linkage includes a locking device responsive to the control device, the locking device defining one of the first and second coupling regions and the actuator defining the other of the first and second coupling regions, the locking device being movably coupled to the actuator and being arranged to inhibit relative movement between itself and the actuator in response to the control device being in its first configuration and permitting relative movement between itself and the actuator in response to the control device being in its second configuration.

In some embodiments, the locking device includes a chamber within which a cylinder head of the actuator is slidably constrained, the chamber having a second control port coupled to a second supply of control fluid and wherein the control device is a control valve having a first configuration in which it permits control fluid to be supplied to the second control port of the locking device at a first pressure and a second configuration in which the control valve permits the supply of control fluid to the second control port at a second pressure less than the first pressure, the control valve being arranged to change from its first configuration to its second configurations in response to the determination being made that at least one of the wheel assemblies is in contact with the ground. Preferably, the second pressure is hydraulic fluid return line pressure.

In some embodiments the locking device and control device together define a mechanical clamp arranged to clamp the actuator when the control device is in its first configuration and release the actuator to permit relative movement between the actuator and clamp when the control device is in its second configuration.

These and other aspects of the present invention will become apparent from, and clarified with reference to, the embodiments described herein.

BRIEF DESCRIPTION OF THE DRAWINGS

Embodiments of the present invention will now be described, by way of example only, with reference to the accompanying drawings, in which.

SPECIFIC DESCRIPTION OF EMBODIMENTS OF THE INVENTION

Figure 1:
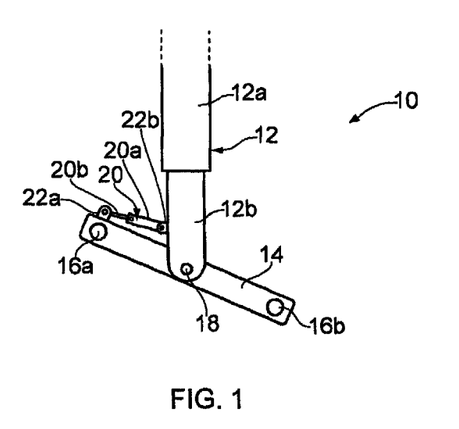
FIG. 1 shows a schematic, partial side view of an aircraft landing gear according to a first embodiment of the present invention.

FIG. 1 shows a partial, schematic side view of a landing gear 10 according to a first embodiment of the present invention. The landing gear 10 includes a main strut 12, having an upper portion 12a arranged to be coupled to the underside of an aircraft (not shown) and a lower portion 12b telescopically mounted with respect to the upper portion 12a. A bogie beam 14 is pivotally coupled to the lower portion of the main strut 12b, the bogie beam 14 having first and second axles 16a, 16b mounted on it, each axle 16a, 16b carrying one or more wheel assemblies (not shown). A landing gear according to embodiments of the present invention may have any suitable number of axles and wheels per axle.

A linkage 20 is pivotally coupled to the bogie beam 14 at a first coupling region 22a and pivotally coupled to the lower strut portion 12b at a second coupling region 22b. In the illustrated embodiment the linkage is defined by an actuator 20. As will be appreciated, pivotal movement of the bogie beam 14 relative to the strut 14 results in a change in the effective length of the actuator 20. The term "effective length" is used to refer to the distance between the first and second coupling regions 22a, 22b. Equally, a change in the effective length of the actuator 20 results in pivotal movement of the bogie beam 14 relative to the strut 12 and the actuator 20 can thus be used to "trim" the position of the bogie beam 14 for stowing. In alternative embodiments the coupling regions 22a, 22b could be reversed and may in other embodiments be coupled between any part of the bogie on the one hand and any part of the strut 12 on the other hand. In some embodiments the linkage 20 may include a multi bar linkage that is movable by an actuator so as to change the angular position of the bogie relative to the strut.

Figure 2:
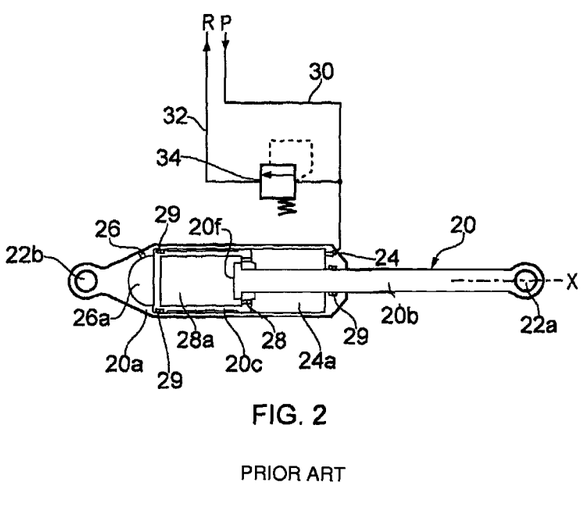
FIG. 2 schematically illustrates a pitch trimming actuator of a known aircraft landing gear.

FIG. 2 schematically illustrates the pitch trimming actuator 20 when coupled to a known hydraulic fluid circuit of a known aircraft landing gear. The actuator 20 includes a casing 20a defining an inner volume that is generally partitioned by a floating piston 20c into a gas chamber 26a and a hydraulic fluid chamber 24a. The gas chamber 26a is vented to atmosphere via a gas port 26. The floating piston 20c is constrained within the inner volume and arranged to slide along an axis X. The casing 20a includes a hydraulic fluid port 24 on the opposite side of the floating piston 20c to the gas port 26. The hydraulic fluid port 24 is arranged to be coupled to a hydraulic fluid circuit. A first dynamic gland seal 29 is provided between the floating piston 20c and casing 20a to inhibit hydraulic fluid passing to the gas side. The floating piston 20c defines a floating piston chamber 28a within which a piston 20f of a piston rod 20b is constrained and arranged to slide along the axis X. The piston rod 20b extends from the piston 20f through an aperture in an axial face of the floating piston 20c and through an aperture in an axial face of the casing 20a, so as to project from the casing 20a. A second dynamic seal 29 is provided between the piston rod 20b and casing 20a within an aperture formed in an axial face of the casing 20a, to inhibit hydraulic fluid from passing out of the casing 20a via the aperture. The axial face of the floating piston 20c through which the piston rod 20b passes includes one or more control apertures 28 arranged to enable fluid communication between the hydraulic fluid chamber 24a and the floating piston chamber 28a.

The piston rod 20b defines the first coupling region 22a arranged to be pivotally coupled to one of the bogie beam and strut. The casing 20a includes the second coupling region 22b arranged to be pivotally coupled to the other one of the bogie beam and strut to which the first coupling 22a region is arranged to be coupled.

The hydraulic fluid circuit includes a pressurised supply line 30, return line 32 and a pressure relief valve 34. The pressurised supply line 30 is arranged to define a fluid passageway between a pressurised source of hydraulic control fluid P and the hydraulic fluid port 24. The return line 32 is arranged to define a fluid passageway between the hydraulic fluid port 24 to the aircraft's hydraulic fluid reservoir R or the like. As will be appreciated, the return line 32 pressure is less than the supply line 30 pressure. The pressure relief valve 34 is arranged in a conventional manner to permit fluid to flow from the supply line 30 to the return line 32 upon the operating pressure within the hydraulic fluid chamber 24a of the actuator 20 exceeding a predetermined threshold. In some embodiments the relief valve 34 is set at a pressure slightly higher than the supply line 30 pressure to prevent continual blow off.

In use, pressurised hydraulic fluid enters the hydraulic fluid port 24 and forces the floating piston 20c to an end stop adjacent the gas port 26, as well as passing through the control apertures 28 into the floating piston chamber 28a and in doing so forcing the piston rod 20b to extend outwardly with respect to the casing 20a. A tensile force applied between the coupling regions 22a, 22b results in the floating piston being drawn away from the end stop adjacent the gas port 26 against the spring force provided by the pressurised hydraulic fluid within the casing 20a. A compressive force applied between the coupling regions 22a, 22b results in the piston 20f of the piston rod 20b moving towards the centre of the floating piston chamber 28a against the spring force provided by the pressurised hydraulic fluid within the casing 20a. This type of actuator can be described as "centre seeking".

During aircraft ground manoeuvres, the effective length of the actuator undergoes a large number of small displacements due to irregularities in the surface of the runway, such as bumps, dips and holes. The pressurised hydraulic fluid is constantly acting against these displacements. This results in the dynamic gland seals 29 experiencing high load, high frequency displacements, which can lead a more rapid deterioration of the seals than could be expected if they were subjected instead to lower frequency displacements. Similarly, the pressure relief valve 34 also deteriorates due to the very high number of pressure cycles experienced. The invention may also decrease tyre wear because the actuator does not force a wheel assembly towards the ground during ground manoeuvres.

Figure 3:
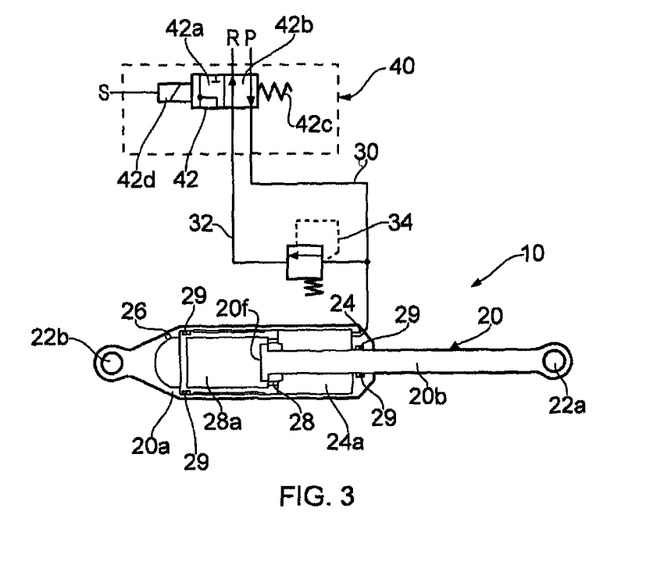
FIG. 3 schematically illustrates a pitch trimming actuator of the aircraft landing gear of FIG. 1.

FIG. 3 schematically illustrates a pitch trimming actuator of the aircraft landing gear of FIG. 1. The actuator 20 in this embodiment is identical to the actuator 20 of FIG. 2 and likes parts have the same reference numerals. However, the landing gear 10 according to this embodiment of the present invention includes or is in combination with a new hydraulic fluid circuit. The hydraulic fluid circuit of this embodiment includes a control valve 40 disposed between the hydraulic fluid port 24 on the one hand and the pressurised source of hydraulic fluid P and hydraulic fluid reservoir R on the other hand. The control valve 40 has a first configuration in which it permits hydraulic fluid to be supplied to the control port 24 of the actuator 20 from the pressurised source of hydraulic fluid P and a second configuration in which the control valve 40 permits the supply of control fluid to the control port 24 at return line R pressure.

In the illustrated embodiment the two configurations are provided by a first routing block 42b and a second routing block 42a. The first routing block 42b puts the supply line 30 in exclusive fluid communication with the pressurised source of hydraulic fluid P and the return line 32 in exclusive fluid communication with the hydraulic fluid reservoir R. Thus, in the first configuration the actuator 20 behaves as it would in a known landing gear. The second routing block 42a isolates the supply line 30 from fluid communication with the pressurised source of hydraulic fluid P and instead puts the supply line 30 in fluid communication with the return line 32, which is in fluid communication with the hydraulic fluid reservoir R. Thus, with the control valve in its second configuration, in which the second routing block 42a places the supply line 30 in exclusive fluid communication with the hydraulic fluid reservoir R, the operating pressure of the actuator 20 is reduced to return line 32 pressure. However, in alternative embodiments the control valve 40 may be arranged such that in its second configuration it permits the supply of control fluid to the control port at any second pressure that is less than the first pressure.

The control valve 40 includes a spring 42c to bias the control valve towards its first configuration. An actuator 42d is provided to change the control valve from its first to its second configurations in response to a signal S, the signal S being indicative of a determination having been made that at least one of the wheel assemblies is in contact with the ground. The signal S can be generated by any suitable means, such as a commonly provided sensor arrangement known in the art as a "weight on wheels" sensor. As will be appreciated from this, a "weight off wheels" sensor may be used to change the control valve from the second to the first configuration. Also, the control valve 40 need not be biased towards its first configuration and may instead be selective moved between positions. In alternative embodiments, the determination that one or more wheel assemblies are on the ground can be made based upon the angular position of the bogie beam, either electronically by way of the sensor, or mechanically. Other suitable arrangements will be apparent.

Thus, upon detecting that the aircraft has touched down the control valve 40 reduces the pressure of the hydraulic control fluid, which reduces the operating pressure and thus the damping ratio of the actuator 20. This is advantageous because, as noted above, the actuator 20 provides a hydraulic damping function that damps pivoting movements of the bogie 14 as it engages bumps or dips in the runway, which results in a variation of distance between the first and second coupling regions 22a, 22b of the actuator 20. This results in the actuator 20 experiencing numerous forces that are short in duration, yet large magnitude. However, these effects on the dynamic gland seals 29 and pressure relieve valve 34 are lessened in a landing gear according to embodiments of the invention because of the fact that the operating pressure of the actuator 20 is reduced upon detection that the aircraft has touched down, thereby reducing the harshness of the operational environment of the actuator 20 during ground manoeuvring.

Figure 4:
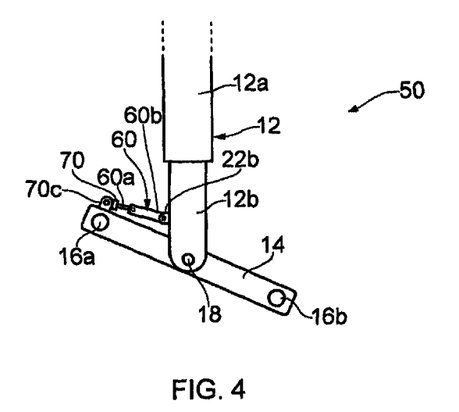
FIG. 4 shows a schematic, partial side view of an aircraft landing gear according to a second embodiment of the present invention.

FIG. 4 shows a partial, schematic side view of a landing gear 50 according to a second embodiment of the present invention. The landing gear 50 is similar to the landing gear 10 according to the first embodiment and like parts have been given corresponding reference numerals. However, in place of the actuator 20, the landing gear 50 includes a linkage 60, 70, the linkage 60, 70 including an actuator 60 and a locking device 70. The linkage 60, 70 is pivotally coupled to the bogie beam 14 at a first coupling region 70c and pivotally coupled to the lower strut portion 12b at a second coupling region 22b. In the illustrated embodiment the locking device 70 defines the first coupling region 70c and the actuator 60 defines the second coupling region 22b. In alternative embodiments the coupling regions 70c, 22b could be reversed and may in other embodiments be coupled between any part of the bogie on the one hand and any part of the strut 12, and in some cases the landing gear 50, on the other hand. The actuator 60 is movably coupled to the locking device 70, such that the effective length of the linkage can be changed whist the actuator 60 and locking device 70 remain coupled to one another. The locking device 70 has a first configuration in which it inhibits relative movement between itself 70 and the actuator 60 and a second configuration in which the locking device 70 permits relative movement between itself 70 and the actuator 60. The locking device 60 is arranged to change from its first configuration to its second configuration in response to a determination being made that at least one of the wheel assemblies of the landing gear 50 is in contact with the ground. This determination can be made as described above with reference to the first embodiment.

Figure 5A:
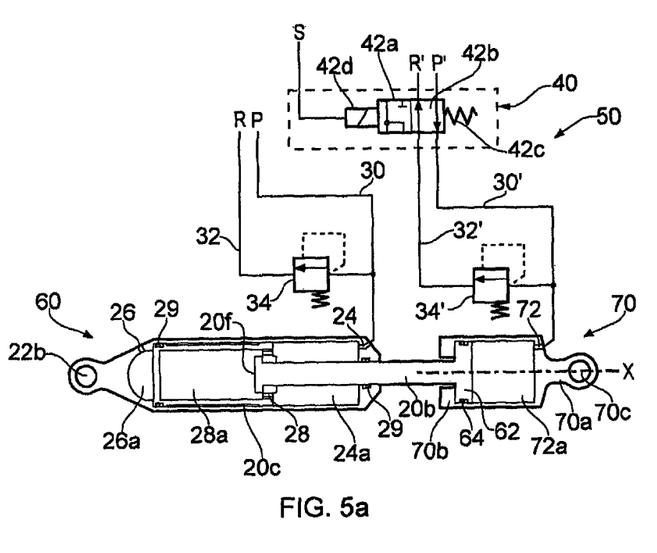
FIG. 5*a* schematically illustrates a pitch trimming linkage of the aircraft landing gear of FIG. 4, in a trimming configuration.
Figure 5B:
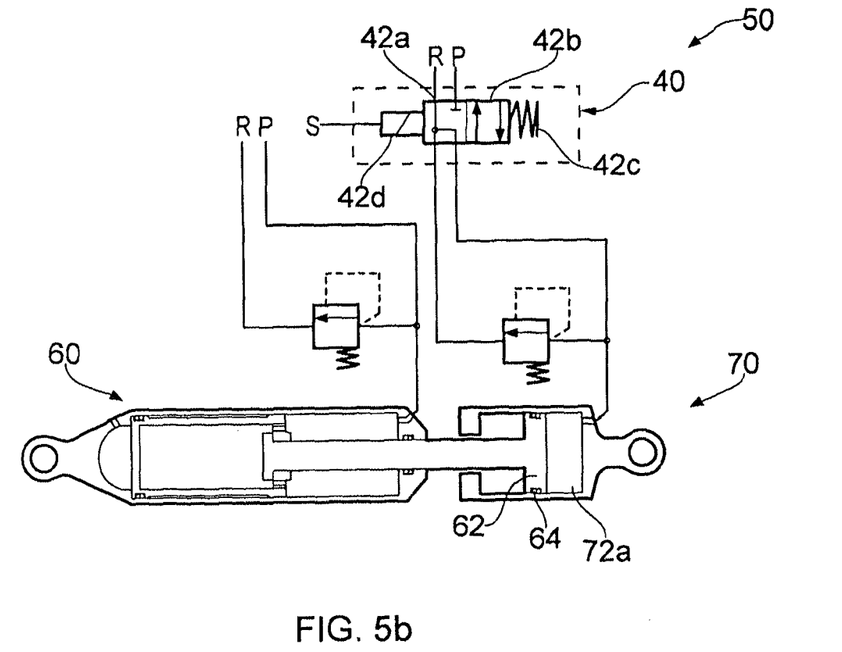
FIG. 5*b* schematically illustrates the pitch trimming linkage of the aircraft landing gear of FIG. 4, in a disabled configuration.

FIGS. 5a and 5b schematically illustrate the pitch trimming linkage 60, 70 of the aircraft landing gear of FIG. 4. The actuator 60 according to this embodiment is similar to the actuator 20 according to the first embodiment, with like parts being denoted by the same reference numerals. The hydraulic fluid port 24 is arranged to be coupled to a known hydraulic fluid circuit, as shown in FIG. 2. Thus, in use, the actuator 60 is constantly driven towards a predetermined level of extension corresponding to a trimmed bogie position. The actuator 60 of this embodiment differs from the actuator 20 of the first embodiment in that the piston rod 20b includes a second piston 62 at an end region thereof.

The locking device 70 includes a housing 70a defining a chamber 72a within which the second piston 62 of the actuator 60 is constrained and arranged to slide along the axis X. The casing 70a of the locking device 70 includes a second hydraulic fluid control port 72 arranged to be coupled to a second hydraulic fluid circuit that is similar to the hydraulic fluid circuit shown in FIG. 3. The second hydraulic fluid circuit includes a control valve 40 disposed between the second control port 72 on the one hand and a second pressurised source of hydraulic fluid P' and second hydraulic fluid reservoir R' on the other hand. The control valve 40 has a first configuration in which it permits hydraulic fluid to be supplied to the second control port 72 of the locking device 70 from the second pressurised source of hydraulic fluid P' and a second configuration in which the control valve 40 permits the supply of control fluid to the control port 72 at return line R' pressure.

In the illustrated embodiment the two configurations are provided by a first routing block 42b and a second routing block 42a that may be put into mutually exclusive fluid communication with the supply P' and reservoir R'. The first routing block 42b is arranged to put the second supply line 30' in exclusive fluid communication with the second pressurised source of hydraulic fluid P' and the second return line 32' in exclusive fluid communication with the second hydraulic fluid reservoir R'. Thus, in the first configuration the piston 62 is forced against end stops 70 b of the locking device casing 70 a by the pressurised hydraulic fluid within the chamber 72 a of the locking device.

The second routing block 42a is arranged to isolate the second supply line 30' from fluid communication with the second pressurised source of hydraulic fluid P' and instead puts the second supply line 30' in fluid communication with the second return line 32', which is in fluid communication with the second hydraulic fluid reservoir R'. Thus, with the control valve 40 and thus the locking device 70 in its second configuration, as shown in FIG. 5 b, the second routing block 42a places the supply line 30' in fluid communication with the second hydraulic fluid reservoir R' and consequently the operating pressure of the locking device 70 is reduced to return line pressure such that the piston 62 can slide within the chamber 72a so as to permit variation of the effective length of the linkage 60,70. However, in alternative embodiments the control valve 40 may be arranged such that in its second configuration it permits the supply of control fluid to the control port 72 at any second pressure that is less than the supply pressure P'.

The control valve 40 includes a spring 42c to bias the control valve and thus the locking device 70 towards its first configuration. An actuator 42d is provided to change the control valve and thus the locking device from its first to its second configurations in response to a signal S being indicative of a determination having been made that at least one of the wheel assemblies is in contact with the ground. The signal S can be generated by any suitable means, such as a commonly provided sensor arrangement known in the art as a "weight on wheels" sensor. Also, the control valve 40 need not be biased towards its first configuration and may instead be selective moved between positions.

Thus, upon detecting that the aircraft has touched down the control valve 40 reduces the pressure of the hydraulic control fluid, which reduces the operating pressure and thus the damping ratio of the locking device 70, which reduces the axial rigidity of the linkage 60, 70. This is advantageous because, with the locking device in its first configuration, the actuator 60 would provide a hydraulic damping function that damps pivoting movements of the bogie 14 as it engages bumps or dips in the runway, which result in a variation of distance between the first and second coupling regions 70c, 22b. This would result in the actuator 60 and locking device 70 experiencing high frequency, large magnitude forces. However, these effects on the dynamic gland seals 29, 64 and pressure relieve valves 34, 34' are lessened in a landing gear according to embodiments of the invention because of the fact that the operating pressure of the locking device 70 is reduced upon detection that the aircraft has touched down, thereby reducing the harshness of the operational environment of both the actuator 60 and the locking device 70 during ground manoeuvring.

In alternative embodiments the locking device 70 can take other suitable forms capable of having a first configuration wherein it inhibits variation in the effective length of the linkage 60, 70 and a second configuration where it permits such variation, for example the locking device could take the form of a mechanical clamp arranged to clamp the piston rob 20b of the actuator 60 when in its first configuration and release the piston rod in its second configuration.

While specific hydraulic fluid control circuits have been described in the illustrated embodiments, a person skilled in the art will see numerous alternative hydraulic fluid control circuits that could provide the same functionality.

The invention claimed is:

1. An aircraft landing gear including:
  a main strut having an upper portion arranged to be coupled to an underside of an aircraft and a lower portion telescopically mounted with respect to the upper portion;
  a bogie including a bogie beam pivotally coupled to the lower portion of the main strut, the bogie beam having a plurality of axles mounted on it, each axle carrying one or more wheel assemblies;
  an actuator arranged such that a change in its effective length causes a change in the angular position of the bogie relative to the main strut, and a control port arranged to be coupled to a control fluid supply system,
  wherein the aircraft landing gear includes or is in combination with a control valve having a first configuration in which it permits control fluid to be supplied to the control port of the actuator at a first pressure and a second configuration in which the control valve permits the supply of control fluid to the control port at a second pressure less than the first pressure, the actuator being arranged such that its operating pressure is reduced when the control valve is in the second configuration so as to reduce loads experienced by components of the actuator during taxiing.

2. An aircraft landing gear according to claim 1, wherein the control valve is arranged to change from its first configuration to its second configuration in response to a determination being made that one or more of the wheel assemblies are in contact with the ground.

3. An aircraft landing gear according to claim 1, wherein the control valve is arranged to change from its second configuration to its first configuration in response to a weight-off-wheels signal.

4. An aircraft landing gear according claim 1, wherein the source of control fluid includes a fluid supply line and a fluid return line, the fluid supply line pressure being greater than the fluid return line pressure, the control valve being arranged in its first configuration to permit both supply line and return line to be in full fluid communication with the control port, and arranged in its second configuration to permit the return line to be in full fluid communication with the control port and to restrict the level of fluid communication between the supply line and the control port.

5. An aircraft landing gear according to claim 4, wherein in its second configuration the control valve fully restricts fluid communication between the supply line and the control port.

6. An aircraft landing gear according to claim 1, wherein the landing gear is coupled to the aircraft such that it may be moved from a deployed position to a stowed position and the actuator is arranged such that supply of the control fluid at the first pressure causes the actuator to adopt an effective length corresponding to that required to angularly position the bogie in its correct position for stowage.

7. An aircraft landing gear according to claim 1, wherein the components of the actuator are dynamic seals.

8. An aircraft landing gear including:
  a main strut having an upper portion arranged to be coupled to an underside of an aircraft and a lower portion telescopically mounted with respect to the upper portion;
  a bogie including a bogie beam pivotally coupled to the lower portion of the main strut, the bogie beam having a plurality of axles mounted on it, each axle carrying one or more wheel assemblies;
  a linkage including a first coupling region via which it is pivotally coupled to the bogie and a second coupling region via which it is pivotally coupled to the main strut, the linkage being arranged such that its effective length can be changed so as to cause a change in the angular position of the bogie relative to the strut, the linkage including an actuator including a control port arranged to be coupled to a control fluid supply system,
  wherein the linkage includes a locking device external to the actuator, the actuator being movably coupled to the locking device, the locking device having a first configuration in which the locking device is configured to inhibit relative movement between itself and the actuator such that a change in the effective length of the actuator causes a change in the angular position of the bogie relative to the strut and a second configuration in which the locking device is configured to permit relative movement between itself and the actuator so as to reduce loads experienced by components of the actuator during taxiing.

9. An aircraft landing gear according to claim 8, wherein the locking device is arranged to change from its first configuration to its second configuration in response to a determination being made that one or more of the wheel assemblies is in contact with the ground.

10. An aircraft landing gear according to claim 8, wherein the locking device is arranged to change from its second configuration to its first configuration in response to a weight-off-wheels signal.

11. An aircraft landing gear according to claim 8, wherein the landing gear is coupled to the aircraft such that it may be moved from a deployed position to a stowed position and the actuator is arranged such that supply of the control fluid at the first pressure causes the actuator to adopt an effective length corresponding to that required to angularly position the bogie in its correct position for stowage.

12. An aircraft landing gear according to claim 8, wherein the locking device includes a chamber within which a cylinder head of the actuator is slidably constrained, the chamber having a second control port coupled to a second supply of control fluid, the locking device further including a control valve which it permits control fluid to be supplied to the second control port of the locking device at a first pressure when the locking device is in its first configuration and permits the supply of control fluid to the second control port at a second pressure less than the first pressure when the locking device is in its second configuration.

13. An aircraft landing gear according to claim 8, wherein the locking device includes a mechanical clamp arranged to clamp the actuator when the locking device is in its first configuration and release the actuator to an extent permitting relative movement between the actuator and clamp when the locking device is in its second configuration.

14. An aircraft landing gear according to claim 8, wherein the components of the actuator are dynamic seals.

15. An aircraft landing gear according to claim 2, wherein the control valve is arranged to change from its second configuration to its first configuration in response to a weight-off-wheels signal.

16. An aircraft landing gear according to claim 9, wherein the locking device is arranged to change from its second configuration to its first configuration in response to a weight-off-wheels signal.

17. An aircraft landing gear according to claim 8, wherein the locking device is positioned in series with the actuator along the linkage.

18. An aircraft landing gear according to claim 8, wherein the locking device is coupled to an end of the actuator.

* * * * *